A. L. PREVOST.
CLOTHESPIN AND MANUFACTURE THEREOF.
APPLICATION FILED MAR. 18, 1920.
1,382,931.
Patented June 28, 1921.
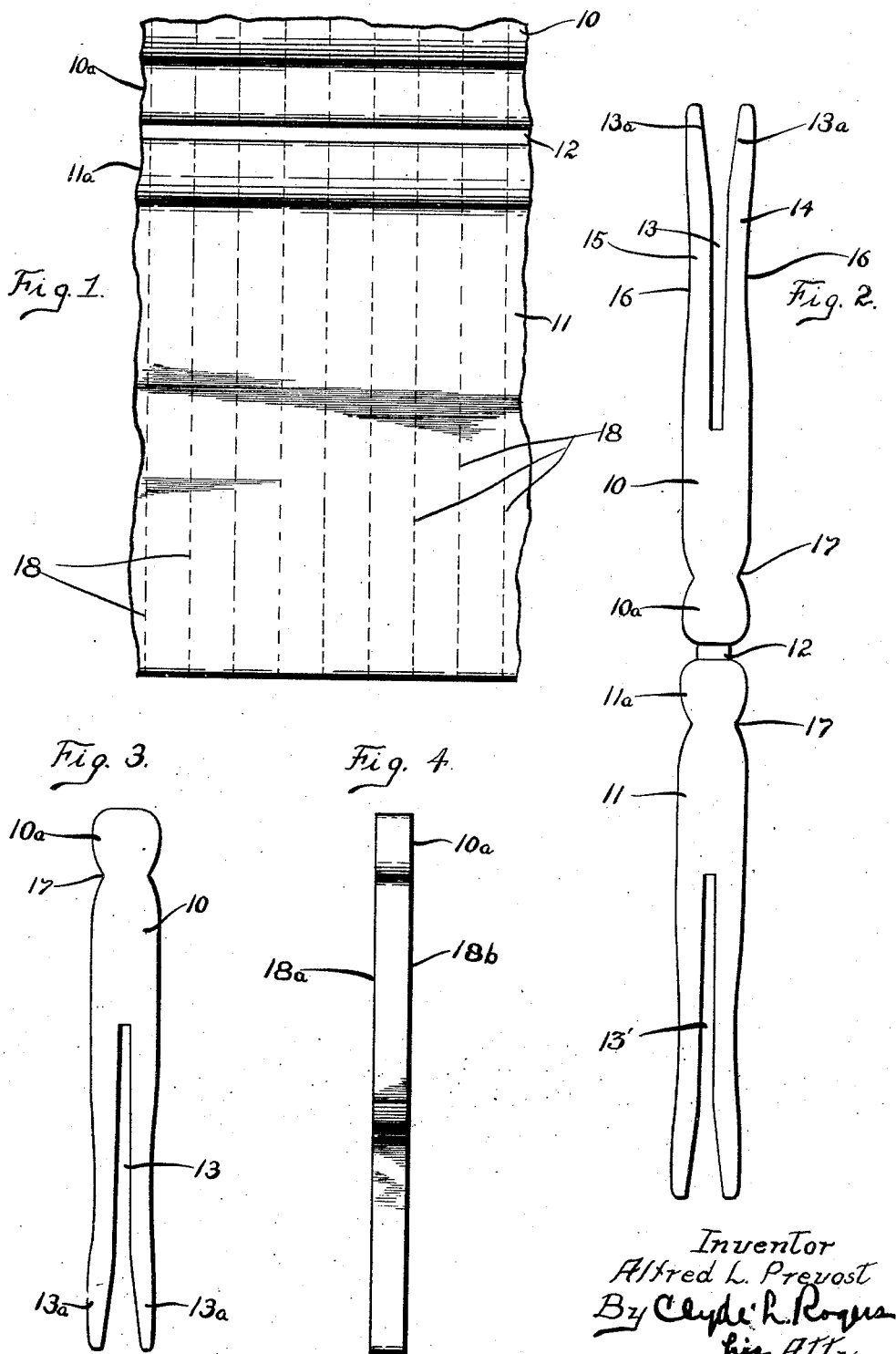
Inventor
Alfred L. Prevost
By Clyde L. Rogers
his Atty.

UNITED STATES PATENT OFFICE.

ALFRED L. PREVOST, OF MYSTIC, CONNECTICUT.

CLOTHESPIN AND MANUFACTURE THEREOF.

1,382,931.  Specification of Letters Patent.  Patented June 28, 1921.

Application filed March 18, 1920. Serial No. 366,933.

*To all whom it may concern:*

Be it known that I, ALFRED L. PREVOST, a citizen of the United States, and resident of Mystic, county of New London, State of Connecticut, have invented an Improvement in Clothespins and Manufacture Thereof, of which the following description, in connection with the accompanying drawings, is a specification, like characters on the drawings representing like parts in each of the several views.

This invention relates to clothespins and the manufacture thereof and more particularly to an improved type of clothespin with flat sides transverse of the kerf or slot therein. I have devised a method of manufacture whereby clothespins of this form may be made much more rapidly and economically and with a large saving of stock as compared with the round, turned clothespins heretofore in common use. Further a clothespin with flat sides produced in accordance with the invention has more flexibility in its prongs with less likelihood of splitting the wood, and also sticks on the line better and holds the clothes more securely. The foregoing and other objects and advantages of the invention will more fully appear from the following detailed description, and the distinctive features of novelty will be thereafter pointed out in the appended claims.

Referring to the drawings:

Figure 1 is a partial elevation illustrating a piece of stock in course of the manufacture of my improved clothespins therefrom;

Fig. 2 is an edge view of the formed stock piece;

Fig. 3 is a side elevation of a clothespin produced in accordance with the invention; and Fig. 4 is an edge view thereof.

I first provide a piece of stock of a width lengthwise of the wood grain slightly greater than twice the length of the clothespin to be produced and of a thickness corresponding to the maximum width of the clothespin. This slab or piece of stock may be of any length, its length determining the number of clothespins that may be produced therefrom. This slab or piece of stock is first run through a molding and shaping machine to shape the sides thereof in the outline of two clothespins 10, 11 end to end with their heads $10^a$, $11^a$ joined by a short connecting web portion 12. The sides of the material piece or slab are operated on by suitable tools which may be formed routing tools, to produce slots 13, 14 extending inward from the sides of the slab intermediate the width thereof and producing the prongs 14, 15 of the clothespins. These routing or forming cutters are shaped so as to produce a V-form indicated at $13^a$ in the outer portions of the slots 13, thus making the prongs adapted to receive and grip the clothes line as usual. The forming or molding cutters operative on the outer sides of the slab also produce concave outlines indicated at 16 in the outer sides of the prongs, and also preferably somewhat reduced necks 17 back of the heads $10^a$, $11^a$. The material slab thus molded and formed is cut lengthwise midway of its width to sever and remove the connecting web 12 and is then sawed or sliced along the dotted lines 18 to produce the completed clothespins with flat sides $18^a$, $18^b$. Thus the completed clothespin is formed with only two operations, i. e., the preliminary molding and forming of the slab or board to the required outline, and the severing of the slab stock into individual pins. Thus a great saving of time and expense in the making of the clothespins is attained, since in the making of the usual turned round clothespins at least five operations have been required. Further a substantial economy of stock is possible since the amount actually used in the flat form is less than in the round pins, and further for the reason that in making the round turned pins there is a considerable wastage of stock involved in turning them to a round cross section. This saving of stock I have found to be as much as twenty-five per cent. The clothespins thus produced provide resilient prongs 14, 15 of a more flexible and better gripping quality than is found in the usual round pins and since this greater degree of springiness in the prongs is available the clothespins will accommodate themselves to greater variations in dimension of the clothes line and articles secured thereon than is the case with previous types. I am aware that the invention may be embodied in other specific forms without departing from the spirit or essential attributes thereof and I therefore desire the present embodiment to be considered in all respects as illustrative and not restrictive, reference being had to the appended claims rather than to the foregoing description to indicate the scope of the invention.

Having described my invention what I claim as new and desire to secure by Letters Patent is:

1. The herein described method of making clothespins which consists in forming a slab to the outline in cross section of two clothespins with heads abutting, and severing the same longitudinally midway of its width and also at intervals transversely to produce a series of clothespins with flat sides.

2. The herein described method of making clothespins which consists in forming a slab into the outline of a clothespin in cross section, and in severing the slab at intervals with straight cuts to produce a series of clothespins with flat sides.

3. A clothespin blank, composed of a slab of substantial length and containing stock for a multiplicity of clothespins molded and formed into the outline in cross section of two clothespins with heads abutting and joined by a connecting web.

In testimony whereof, I have signed my name to this specification.

ALFRED L. PREVOST.